United States Patent [19]
Davis

[11] Patent Number: 5,920,177
[45] Date of Patent: Jul. 6, 1999

[54] AUTONOMOUSLY POWERED COMMUNICATIONS CARD MODEM HAVING ADDITIONAL COMMUNICATIONS PORT FOR USE AS AN EXTERNAL MODEM

[75] Inventor: Gerald Davis, Hillsborough, N.C.

[73] Assignee: 3Com Corporation, Santa Clara, Calif.

[21] Appl. No.: 09/034,142

[22] Filed: Feb. 24, 1998

[51] Int. Cl.$^6$ .................................................. H01M 10/46
[52] U.S. Cl. .......................................... 320/114; 320/135
[58] Field of Search .................................... 320/107, 112, 320/113, 114, 127, 128, 135, 137, 138; 375/222; 455/557

[56] References Cited

U.S. PATENT DOCUMENTS

| | | | |
|---|---|---|---|
| 5,519,527 | 5/1996 | Panton | 359/159 |
| 5,541,985 | 7/1996 | Ishii et al. | 379/111 |
| 5,717,567 | 2/1998 | Tao | 361/683 |
| 5,739,665 | 4/1998 | Bares | 320/115 |

*Primary Examiner*—Edward H. Tso
*Attorney, Agent, or Firm*—Workman, Nydegger & Seeley

[57] ABSTRACT

A communications card modem useful as an internal modem in a personal computer (PC) is configured with an autonomous power supply and an additional communications port for converting the modem into an external modem for a mobile user input device, such as a PDA. In a preferred embodiment, the autonomous power supply is an integrated rechargeable power source, such as a secondary battery like nickel-cadmium, nickel-metal-hydroxide or lithium-ion. The secondary battery is recharged by means of the computer power supply, during use of the computer, so that a user can remove the modem from the computer and still maintain an electrical power supply for the modem. Preferred communication ports for interfacing with the user input device include serial ports such as an EIA-232-D or an IrDA port. An isolation circuit within the modem is provided to determine whether the computer power supply or the autonomous power supply is to energize the modem circuitry. A switch, operable by the user, may additionally be included to indicate to the isolation circuitry which electrical power supply should energize the modem circuitry.

14 Claims, 2 Drawing Sheets

AUTONOMOUSLY POWERED COMMUNICATIONS CARD MODEM HAVING ADDITIONAL COMMUNICATIONS PORT FOR USE AS AN EXTERNAL MODEM

BACKGROUND OF THE INVENTION

1. The Field of the Invention

The present invention relates generally to modems. More specifically the present invention relates to a communications card modem for a personal computer useful as an external modem for a variety of user input devices such as a hand-held computing device.

2. The Relevant Technology

Many hand-held computing devices are emerging as invaluable configurations particularly useful for organizing and storing user input information. Some of those configurations are known as personal data assistance (PDA) devices. In general, PDA's are compact and streamlined user input/interface devices possessing a modest footprint which facilitates mobility and ease of storage. As such, PDA's have been vying with, and proven beneficial as alternatives to, desktop and personal computers (PC's).

Many PDA's are even beginning to communicate with other computing system configurations in order to download their stored data onto larger storage platforms. This frees precious storage space in the PDA and affords a user more capabilities to manage their data, in the context of other programs, when downloaded to another configuration. Typically, the download has been effectuated via various data communication devices such as serial port interfaces, modems, transmitters and other similar devices useful in transferring data.

This transfer, however, has involved compromise. For example, some PDA's require the use of a modem in a desktop style computer which results in a cumbersome transfer of data because desktop computers are relatively awkward and bulky to use. Since desktop computers are also relatively immobile, data transfer from PDA's cannot take place in environments not accessible to desktop computers. Detrimentally, many of these environments include places frequently necessitating the transfer of data such as airplanes, vehicles and public phone booths.

Many times, PDA's interface with a PC to transfer data via the communications card modem therein. Since data is conventionally transferred in a serial manner, PC's require an additional serial port to accommodate the PDA which increases equipment costs. Moreover, many serial ports on a PC need an adapter in order to communicate with the serial port on the PDA. Not only does this too increase costs, but adapters are often forgotten by the user because they are an additional piece of computing equipment. Adapters also require electrical compatibility which frequently does not exist. In turn, the data transfer capabilities of the PDA are rendered ineffective.

Moreover, the communications card modem in a PC requires the use of the PC to supply power to the modem. Thus, to transfer data from a PDA to another computing configuration via the phone lines, for example, a PDA user must also carry along the PC for powering the modem. This is cumbersome and superfluous.

Bypassing the modem links of desktops and PC's and directly configuring an internal modem into a PDA, however, compromises the streamlined and compact nature of the PDA. This also adds expense.

Ever-evolving PDA technology is also giving rise to various other methods of transferring data. Such other methods include infrared and radio transmission schemes. Since most computing system configurations are presently unable to communicate by infrared or radio, it is economically desirous to adapt presently existing configurations to these evolving technologies instead of redesigning and developing new configurations. It is also convenient to adapt these existing configurations because of their ubiquity.

Accordingly, it is desirous to find alternatives for efficaciously transferring data from user input devices, such as hand-held PDA's, to various other computing system configurations.

SUMMARY AND OBJECTS OF THE INVENTION

It is, therefore, an object of the present invention to configure a modem for achieving mobile compatibility with mobile user input devices such as hand-held PDA's.

It is another object of the present invention to provide a modem with an autonomous power supply to achieve mobile compatibility with a user input device.

It is a further object of the present invention to provide a modem for a user input device being free from extraneous adaptors.

It is yet another object of the present invention to provide a modem with a footprint comparable to user input devices such as PDA's.

It is a concomitant object of the present invention to be able to adapt existing data transfer devices, such as modems, to interface directly with user input devices to efficaciously transfer data therefrom.

It is still a concomitant object of the present invention to provide an economically feasible modem that achieves mobile and footprint compatibility with user input devices such as PDA's.

In accordance with the invention as embodied and broadly described herein, the foregoing and other objectives are achieved by configuring a PCMCIA style communications card modem, useful as an internal modem in a personal computer (PC), with an autonomous power supply and an additional communications port to convert the modem into an external modem for a mobile user input device such as a PDA.

In a preferred embodiment, the autonomous power supply is an integrated rechargeable power source, such as a secondary battery like nickel-cadmium or lithium-ion. The secondary battery is recharged by means of the computer power supply, during use of the computer, so that a user can remove the modem from the computer and still maintain an electrical power supply for the modem. In this manner, a user is provided with a modem having mobility, compactness and a streamlined profile that is conveniently compatible with a user input device. Preferred communications ports for the modem include serial ports such as an EIA-232-D and an IrDA port.

The autonomous power supply may alternatively be a dedicated external power supply conveniently plugged in to the modem so that the modem can be removed from the computer and used with a user input device.

An isolation circuit within the modem is provided to determine whether the computer power supply or the autonomous power supply is to energize the modem circuitry. A switch, operable by the user, may additionally be included to indicate to the isolation circuitry which electrical power supply should be used to energize the modem circuitry.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

Figure 1:
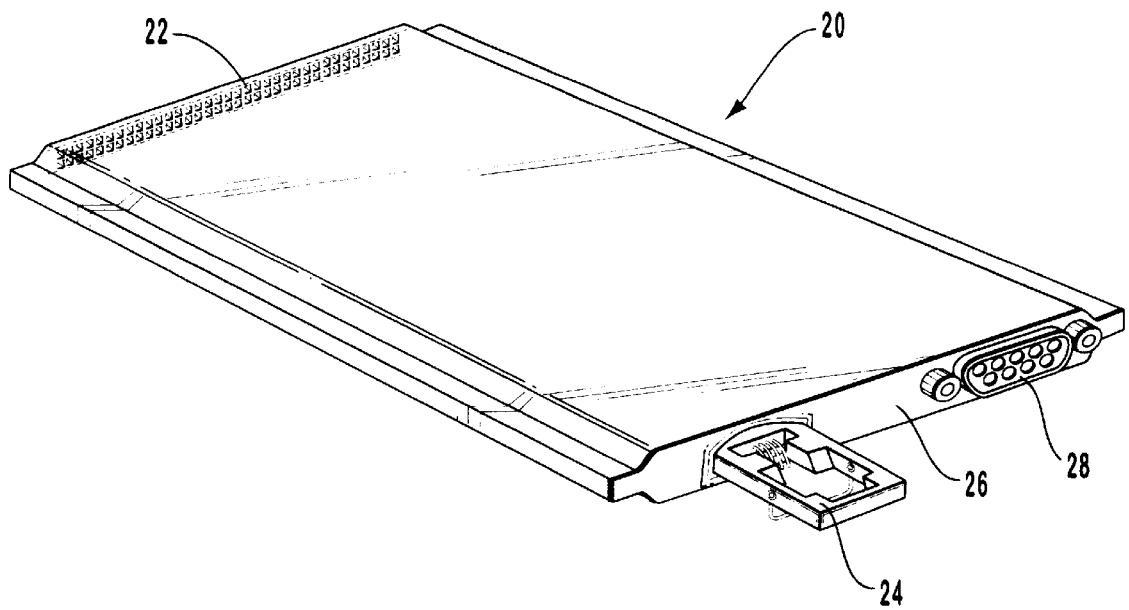
FIG. 1 is a perspective view of a communications card modem having an additional communications port in accordance with the present invention.

A communications card modem useful as an internal modem in a personal computer (PC) is configured with an autonomous power supply and an additional communications port for use as an external modem for a mobile, user input/interface device.

As used herein, "mobile user input/interface device" or "user input device" refers to computing system configurations such as a personal data assistance (PDA) device, a hand-held device, a consumer electronic device or a similar other device characteristically being compact, streamlined and extremely mobile. User input devices also characteristically possess limited magnetic storage capabilities and are typically used for storing and organizing user input data such as, scheduling, day-planner and personal information.

It is a feature of the present invention to provide an external modem for use with a user input device that is mobile, compact and streamlined to provide a user a mobile and convenient means for downloading or transferring data information stored on the user input device from many and diverse locations. Typically, data from the user input device is downloaded onto a "computing system configuration" or "computer" characteristically possessing larger magnetic storage capabilities. Such "computers" having larger storage capabilities include, but are not limited to, a desktop computer, a personal computer (PC), a mainframe, a minicomputer or a computer cluster. It is, however, sometimes useful to download or transfer data from one user input device to another. In either circumstance, the communications card modem described herein is suitable for effectuating this data transfer.

As used herein, "communications card modem" or "modem" refers to a communications card modem falling within the memory card parameters defined by the Personal Computer Memory Card International Association (PCMCIA), i.e., a rectangular space approximately 55 mm in width, 85 mm in length, and 5 mm in depth. Accordingly, a communications card modem also refers to PCMCIA architecture modem cards, PCMCIA architecture network cards, such as a LAN, or equivalents thereof. In operation, a typical communications card modem is used in a PCMCIA slot on a PC to serially transfer data from the PC to a media connector for transmission over a communication line.

As used herein, a communications card modem is also configured as a compatible interface between the phone lines and a computer in accordance with the guidelines established by, both, the Federal Communications Commission ("F.C.C.") and various regional telephone companies. In accordance therewith, a presently required portion of this interface includes a Data Access Arrangement ("DAA") circuit. The DAA circuit provides an impedance match and also serves to isolate the modem and the computer from transient signals and other disturbances coming in over the phone line. In this manner, the modem acts as a protective barrier between the computer or user input device and the phone lines and moderates all signals or energy being input into the phone lines to protect the phone lines and related systems from damage.

As used herein, a "media connector" or "miniature modular jack physical/electrical media connector" connotes a media connector such as those connectors having physical attributes described in F.C.C. part 68, sub-part F, expressly incorporated herein by reference. Specific media connectors such as a RJ-11 or a RJ-45 are merely references to a specific exemplary media connector falling within the broader parameters of the term "media connector" and should not be used to limit the scope of the present invention to specific connectors.

As used herein, a "communications line" refers to those devices suitable for transferring data from one computing system configuration to another. As such, typical communication lines include, but are not limited to, phone lines, network cables, coaxial cables, shielded and unshielded twisted pair cables and other similar data transferring devices.

With reference to FIG. 1, a communications card modem in accordance with the present invention for ultimately providing data transferring capabilities between a user input device and a communications line is depicted generally as 20. At one end of the modem 20 is a connector 22 for electrically interfacing with a PC. Preferably, the connector 22 is a 68 pin connector well known to those skilled in the art but may additionally be any connector type suitable for interfacing between a modem and a PC.

At the other end of the modem 20 is a first communications port, a media connector port 24, for affording interface capabilities between a media connector and a communications line. Many embodiments of media connector ports are commercially available, but a slidable or "pop-out" style port has emerged as a preferred media connector port. This port, known commonly as the XJACK® initially produced by MEGAHERTZ Corp., now owned by 3 Com Corp., solves many of the interface problems posed by prior art devices. For example, since a typical media connector, such as an RJ-11, has a depth thickness of about 8 to about 11 mm and the depth thickness of a PCMCIA style modem is about 5 mm, a depth incompatibility problem exists that impacts upon the interfacing between the two devices. The XJACK, however, has solved this depth incompatibility problem because the media connecter port "pops-out" from the modem and the media connector is inserted vertically into the media connector port instead of horizontally as is done with other prior art devices.

The XJACK has also solved additional problems such as: (i) the elimination of carrying along an extra interfacing device compatible with both the media connector port and the communications card modem; (ii) the elimination of ensuring a DAA in the modem is compatible with the computer; (iii) the elimination of physical interference between adjacent communication card modems in adjacent slots when the modem has an enlarged portion thereof larger than the conventional 5 mm thickness; (iv) the elimination of potential breakage of the media connector port when not in use; and (v) the elimination of protrusions beyond the normal dimensions of the computer so that the PC portfolio is more compatible with devices typically transporting portable PC's.

As depicted in FIG. 1, a typical embodiment of a sliding interface media connector port for directly interfacing with a media connector is depicted as slidably engaged with a housing 26 of the modem 20. However, it should be appreciated that even further embodiments of the media connector port 24 suitable for slidably engaging the housing 26 and for accepting a media connector during use are contemplated within the scope of the present invention. These further embodiments are more fully described in U.S. Pat. Nos. 5,183,404, 5,336,099 and 5,338,210 and are all expressly incorporated herein by reference.

On the same end of the modem 20 as the media connector port 24, is a second communications port, a data terminal equipment (DTE) port 28. In general, the DTE port 28 is configured to interface with a comparable communications port on a user input device (not shown). This interface allows the user input device a direct access to a modem for transferring data from the user input device to another computing system configuration without having to interface with a computer. In this embodiment, the DTE port 28 is a serial port configured as a 9-pin, D-subminiature connector, useful for serially transferring data in accordance with the EIA-232-D transmission standard.

In general, the EIA-232-D standard, most commonly referred to as the RS-232 standard, is a standard for sending data over distances ranging from a few feet to many miles. This standard specifies, both, the physical connections and signal lines and most serial ports already comply with the EIA-232-D standard. It should be appreciated that other connectors complying with the EIA-232-D standard suitable as the DTE port 28 include, the 25-pin D-subminiature connector, the DIN and miniature DIN, the 36-pin Amphenol Connector and various other edge-card style connectors. The foregoing connectors are to be construed as representative and not restrictive.

Figure 2:
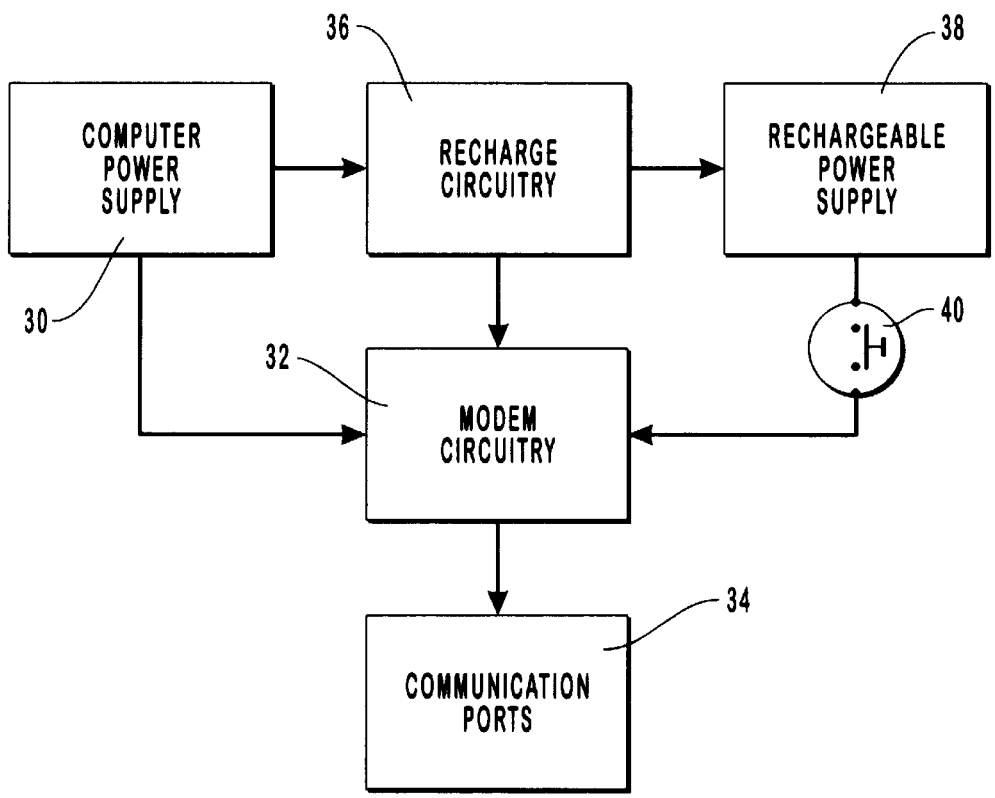
FIG. 2 is a block diagram of exemplary internal circuitry useful with the communications card modem of FIG. 1.

With reference to FIG. 2, a block diagram illustrates an exemplary circuitry structure suitable for use with modem 20. In particular, a computer power supply 30, such as a DC battery pack or an external AC supply supplied to the computer by means of an AC/DC converter, supplies electrical power to the modem 20 during use of the computer. This electrical power is generally supplied to the modem 20 by means of the connector 22. Thereafter, the modem circuitry 32 is energized which enables the transferring of data from the computer to another computer by means of the communications ports 34, such as the media connector port. Since modem circuitry is well known to those skilled in the art, it is not described herein in detail.

Also during use of the computer, and in accordance with the teachings herein, the computer power supply 30 energizes a recharge circuit 36 integrated within the modem 20. In turn, this recharge circuit 36, rechargeably energizes a power source 38. The rechargeable power source 38 is commonly referred to as a secondary battery and includes, but is not limited to, battery types such as alkaline, nickel-cadmium (NiCd), nickel-metal-hydroxide (NiMH) and various lithium technologies such as lithium-ion.

The reason for recharging a secondary battery in the modem 20 is so that a user can remove the modem 20 and utilize the modem 20 exclusively with a user input device to transfer data, without having to carry along the computer to power the modem 20. Then, during use of the user input device, a user simply attaches the user input device to the DTE port 28 and utilizes the modem circuitry 32, internal to the modem 20, to transfer data over a communications line by means of coupling to a media connector attached to the media connector port 24.

Since an important circuitry consideration during recharge of a secondary battery includes a determination about when the secondary battery has been fully charged, the recharge circuitry 36 preferably includes an end-of-charge indicator circuit. Such circuits are well known and include various peak detection circuits. This prevents the adverse effects associated with overcharging the secondary battery.

To indicate to the circuitry within the modem 20 that the rechargeable power source 38 is to electrically supply power to the modem circuitry 32 instead of the computer power supply 30, a switch 40 is provided for initiating a reset. The switch 40 can be of various design and shape and is known. It is preferred, however, that the switch 40 is selected to maintain the compact and streamlined profile of the modem 20 and is positioned to not interfere with the insertion of the modem 20 into a computer PCMCIA slot.

It should be appreciated that the foregoing represents a substantial advancement in the art of transferring data from user input devices. Some of those reasons include, but are not limited to: (i) user input devices now have an external modem possessing comparable mobility and compactness; (ii) user input devices now have an external modem free from extraneous adapters; (iii) user input devices now have an external modem with an autonomous power supply so as to free a user from transporting an extra computer to supply power to the modem; (iv) manufacturers of communication card modems have increased the versatility of their modems; and (v) computer capabilities are improved because an additional communications port is provided to the computer when the modem is inserted therein; in turn, equipment costs of adding an additional communications port directly to the computer are decreased.

Figure 3:
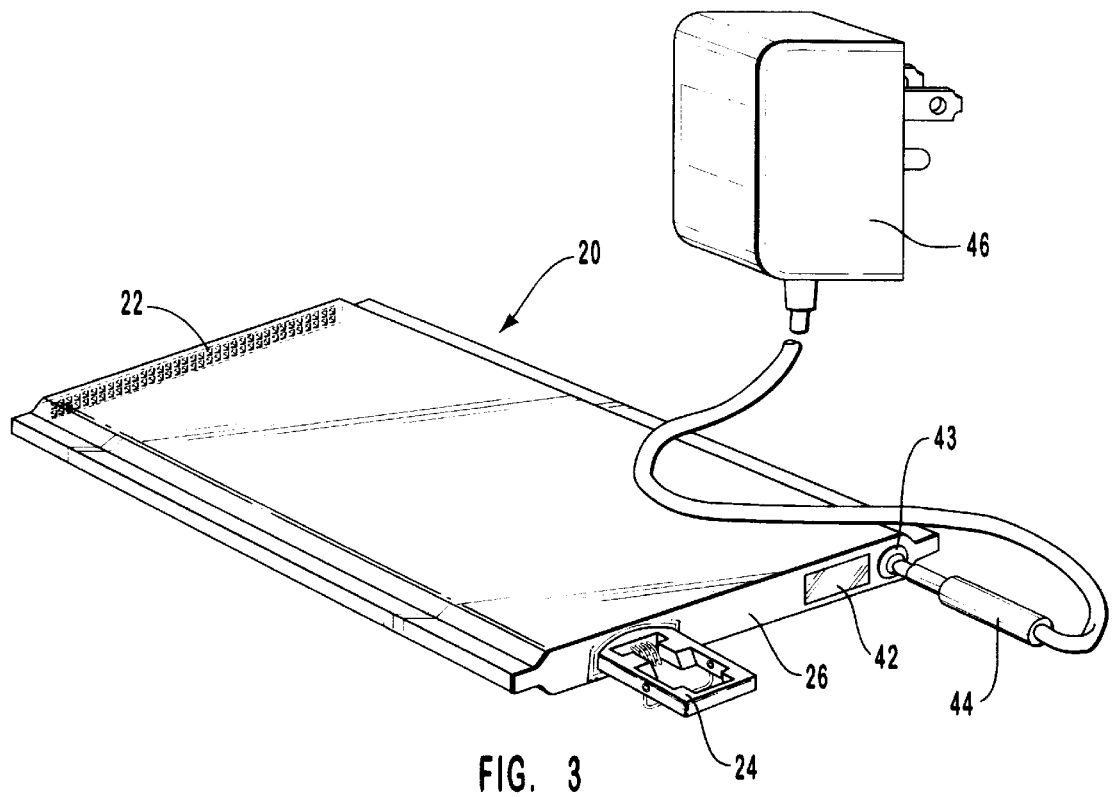
FIG. 3 is a perspective view of a communications card modem having alternative embodiments of a communications port and power supply.

In FIG. 3, an alternative embodiment of modem 20 is depicted. In this embodiment, the second communication port is an Infrared Data Association (IrDA) port 42. In general, an IrDA port 42 is an interoperable infrared serial data link set up according to standards defined by the Infrared Data Association. IrDA ports feature low power consumption and data transferring speeds of up to about 115.2 k bits/sec with anticipated speeds of about 10 M bits/sec. An IrDA port 42 is also a preferred embodiment of modem 20 because IrDA ports are presently being extensively configured into PDA's. Exemplary IrDA ports include, but are not limited to, high speed silicon PIN photodiodes, silicon PIN photodiodes, N-channel enhancement mode MOSFETs, IrDA Serial IR (SIR) integrated transceivers or other similarly related ports.

A power terminal 43 in modem 20 connected to an external power supply 44 having a dedicated AC/DC converter is also depicted in FIG. 3. In this manner, the modem 20 may additionally be configured to receive electrical power without requiring the use of the computer and the computer power supply or a rechargeable power source. External power supply 44 can be attached to the power terminal in modem 20 as a removable attachment or as a fixed attachment. In either embodiment, an exemplary block diagram for energizing circuitry within the modem 20 is depicted in FIG. 4.

Figure 4:
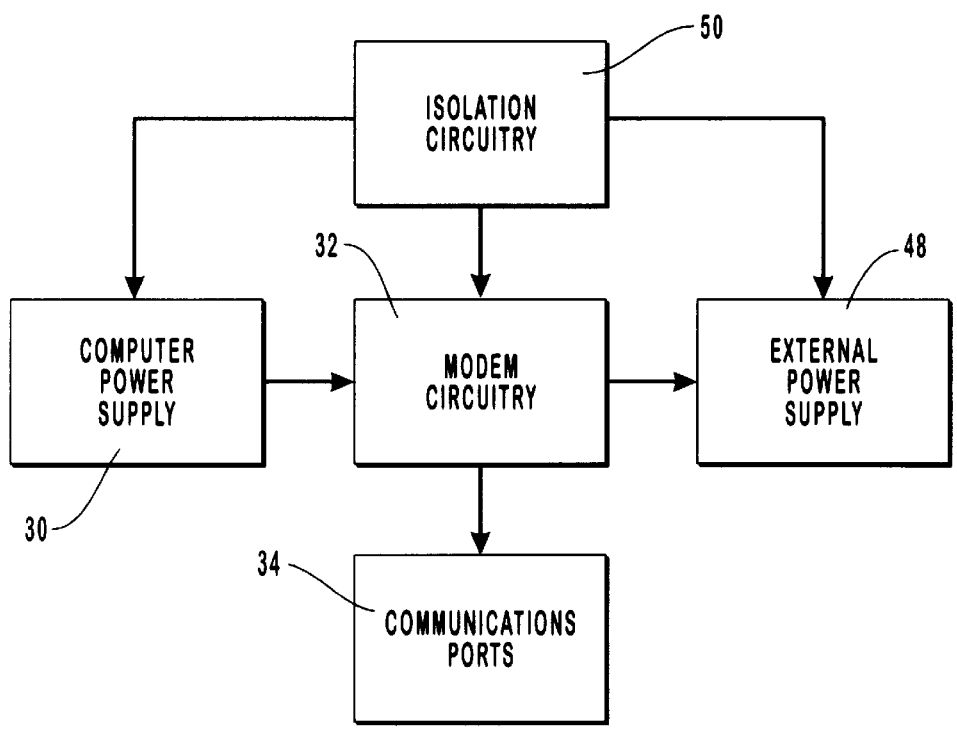
FIG. 4 is a block diagram of exemplary internal circuitry useful with the communications card modem of FIG. 3.

In FIG. 4, a computer power supply 30 is, again, provided to operate modem circuitry 32 during use of the computer. Again, the modem circuitry is coupled to the communication ports 34 in a manner suitable for transferring data during use. Preferably, the coupling is for serial transmission as is well known in the art.

During use of the user input device, however, the external power supply 48 is coupled to the modem circuitry 32 to facilitate the transfer of data from the user input device by way of the communication ports 34. Preferably, isolation circuitry 50 is included in modem 20 for determining whether the modem circuitry 32 should receive electrical power from: (i) the computer, by way of the computer power supply 30 and the connector 22 during use of the computer; or (ii) the external power supply 44 by way of the power terminal 43 during use of the user input device. The isolation circuitry 50 may additionally be coupled to a switch, similar to switch 40, for indicating to the isolation circuitry which electrical power supply is to energize the modem circuitry.

It should be appreciated that the foregoing is merely representative and is not to be construed as limiting. As such, various other alternative embodiments are recognized as being within the scope of the present invention that find equal applicability herein. For example, the communication ports communicating with the user input device may alternatively be configured as a Universal Serial Bus (USB) port. It is even contemplated that the communications port is a sliding interface port similar to the media connector port.

The communication ports may additionally consist of more than two communication ports per modem. Although space considerations are implicated with additional ports, these ports can be designed to be exceptionally small, especially ports that are simply photodiode IrDA ports.

Still other embodiments include solar cells on the housing of the modem to rechargeably energize the rechargeable power source.

The present invention may be embodied in still other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A rechargeably powered communications card modem for use as an external modem for a user input device, comprising:

a connector for electrically interfacing with a computer;

a media connector port for electrically interfacing with a communications line;

a communications port for interfacing with said user input device;

a modem circuit for transferring data from said user input device to said media connector port for transmission through said communications line during use of said user input device; and a recharge circuit that receives electrical power from said computer during use of said computer to rechargeably energize a power source, said power source for electrically powering said modem circuit for use with said user input device during use of said user input device.

2. A rechargeably powered communications card modem according to claim 1, further comprising a switch for initiating the use of said power source during use of said user input device.

3. A rechargeably powered communications card modem according to claim 1, wherein said communications port is a serial port.

4. A rechargeably powered communications card modem according to claim 3, wherein said serial port is an IrDA port, an EIA-232-D port or a USB port.

5. A rechargeably powered communications card modem according to claim 1, wherein said media connector port is slidably engaged with a housing of said communications card modem.

6. An autonomously powered communications card modem for use as an external modem for a user input device, comprising:

a power terminal for interfacing with an external power supply;

a media connector port for electrically interfacing with a communications line;

a data terminal equipment port for interfacing with said user input device; and a modem circuit electrically powered by way of said power terminal for transferring data from said user input device to said media connector port for transmission through said communication line during use of said user input device.

7. An autonomously powered communications card modem according to claim 6, further comprising a connector for receiving electrical power from a computer during use of said computer for electrically powering said modem circuit.

8. An autonomously powered communications card modem according to claim 7, further comprising an isolation circuit for determining whether said modem circuit will receive electrical power by way of said connector or said power terminal.

9. A rechargeably powered communications card modem for use as an external modem for a user input device, comprising:

a pin connector for electrically interfacing with a computer;

a media connector port for electrically interfacing with a communications line;

a serial port for interfacing with said user input device;

a modem circuit for transferring data from,
(i) said user input device to said media connector port for transmission through said communications line during use of said user input device; and
(ii) said computer to said media connector port for transmission through said communications line during use of said computer;

a recharge circuit for receiving electrical power from said computer by way of said pin connector during use of said computer to rechargeably energize a power source, said power source to electrically power said modem circuit for use with said user input device during use of said user input device; and an isolation circuit for determining whether said modem circuit will receive electrical power by way of said pin connector or said power source.

10. A rechargeably powered communications card modem according to claim 9, wherein said serial port is an IrDA, an EIA-232-D or a USB port.

11. A rechargeably powered communications card modem according to claim 10, wherein said power source is a nickel cadmium, nickel metal hydroxide or a lithium ion battery.

12. A rechargeably powered communications card modem according to claim 11, further comprising a switch for indicating to said isolation circuit that said power source is to be used for powering said modem circuit.

13. A rechargeably powered communications card modem according to claim 12, wherein said media connector port is slidably engaged with a housing of said communications card modem.

14. A rechargeably powered communications card modem according to claim 13, wherein said pin connector has 68 pins.

* * * * *

UNITED STATES PATENT AND TRADEMARK OFFICE
CERTIFICATE OF CORRECTION

PATENT NO. : 5,920,177

DATED : July 6, 1999

INVENTOR(S) : Gerald Davis

It is certified that error appears in the above-identified patent and that said Letters Patent are hereby corrected as shown below:

Col. 1, ln. 18: after "general" change "PDA's" to --PDAs--

Col. 1, ln. 20: after "such" change "PDA's" to --PDAs--

Col. 1, ln. 23: after "Many" change "PDA's" to --PDAs--

Col. 1, ln. 35: after "some" change "PDA's" to --PDAs--

Col. 1, ln. 39: after "from" change "PDA's" to --PDAs--

Col. 1, ln. 44: after "times," change "PDA's" to --PDAs--

Col. 1, ln. 46: after "manner" change "PC's" to PCs--

Col. 1, ln. 62: after "and" change "PC's" to PCs--

Col. 2, ln. 10: after "hand-held" change "PDA's" to --PDAs--

Col. 2, ln. 18: after "hand-held" change "PDA's" to --PDAs--

Col. 2, ln. 27: after "as" change "PDA's" to --PDAs--

Col. 2, ln. 35: after "as" change "PDA's" to --PDAs--

Col. 2, ln. 58: after "plugged" change "in to" to --into--

UNITED STATES PATENT AND TRADEMARK OFFICE
CERTIFICATE OF CORRECTION

PATENT NO. : 5,920,177
DATED : July 6, 1999
INVENTOR(S) : Gerald Davis

Page 2 of 2

It is certified that error appears in the above-indentified patent and that said Letters Patent is hereby corrected as shown below:

Col. 5, ln 16: after "table" change "PDA's" to --PDAs--

Signed and Sealed this

Seventeenth Day of April, 2001

Attest:

NICHOLAS P. GODICI

Attesting Officer

Acting Director of the United States Patent and Trademark Office